(12) United States Patent
Alanqari et al.

(10) Patent No.: US 11,084,758 B1
(45) Date of Patent: Aug. 10, 2021

(54) FLY ASH-CEMENT FOR OIL AND GAS CEMENTING APPLICATIONS

(71) Applicant: SAUDI ARABIAN OIL COMPANY, Dhahran (SA)

(72) Inventors: Khawlah A. Alanqari, Al-Khubar (SA); Abdullah Al-Yami, Dhahran (SA); Ali Al-Safran, Dhahran (SA); Vikrant Wagle, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 16/892,665

(22) Filed: Jun. 4, 2020

(51) Int. Cl.
*C04B 28/02* (2006.01)
*C04B 14/30* (2006.01)
*C04B 28/18* (2006.01)
*C04B 14/06* (2006.01)

(52) U.S. Cl.
CPC ............ *C04B 28/021* (2013.01); *C04B 14/06* (2013.01); *C04B 14/304* (2013.01); *C04B 28/182* (2013.01)

(58) Field of Classification Search
CPC ..... C04B 14/06; C04B 14/304; C04B 28/021; C04B 28/182
See application file for complete search history.

(56) References Cited

U.S. PATENT DOCUMENTS

| | | | |
|---|---|---|---|
| 4,235,291 A | 11/1980 | Messenger | |
| 5,772,752 A | 6/1998 | Liskowitz et al. | |
| 5,928,420 A | 7/1999 | Oates et al. | |
| 6,379,455 B1 | 4/2002 | Cohen | |
| 6,832,651 B2 | 12/2004 | Ravi et al. | |
| 7,219,733 B2 | 5/2007 | Luke et al. | |
| 9,505,659 B2 | 11/2016 | Bickbau | |
| 2003/0041785 A1 | 3/2003 | Harrison | |
| 2008/0264301 A1 | 10/2008 | Porat et al. | |
| 2008/0282936 A1 | 11/2008 | Morioka et al. | |
| 2015/0218905 A1 | 8/2015 | Chatterji et al. | |
| 2017/0267586 A1 | 9/2017 | Bullerjahn et al. | |
| 2018/0155248 A1 | 6/2018 | McCandlish et al. | |
| 2019/0284465 A1 | 9/2019 | Al-Yami et al. | |
| 2020/0131425 A1 | 4/2020 | Alsaihati et al. | |

FOREIGN PATENT DOCUMENTS

| EA | 002673 B1 | 8/2002 |
|---|---|---|
| WO | 2006051678 A1 | 5/2006 |
| WO | 2019112555 A1 | 6/2019 |

OTHER PUBLICATIONS

International Search Report and Written Opinion issued in Application No. PCT/US2020/040228, dated Feb. 25, 2021 (12 pages).

*Primary Examiner* — Anthony J Green
(74) *Attorney, Agent, or Firm* — Osha Bergman Watanabe & Burton LLP (57) ABSTRACT

A cementing composition may include a sulfate-resistant cement and fly ash. The sulfate-resistant cement may contain calcium magnesium aluminum oxide silicate, brownmillerite, dolomite, periclase, and quartz. The composition may contain the fly ash in an amount in the range of 10 to 40 wt. %. The sulfate-resistant cement may contain the calcium magnesium aluminum oxide silicate in an amount of the range of 45 to 60 wt. %.

28 Claims, 8 Drawing Sheets

FLY ASH-CEMENT FOR OIL AND GAS CEMENTING APPLICATIONS

BACKGROUND

Wellbores are commonly cemented, where the annulus between the casing and the borehole wall is filled with cement, forming a cement sheath. However, widely-used cements, such as ordinary Portland cement, may react with sulfates. This reaction may weaken the concrete and cause it to expand. Specifically, calcium ions may be leached from the lime ingredients contained in the cement. The calcium ions react with the sulfate ions, eventually yielding ettringite. Given the large amounts of sulfates that may be present in soils, this phenomenon is often encountered in wellbore cementing applications.

Cements with low calcium aluminate may demonstrate better chemical resistance to sulfates, and be labelled as sulfate-resistant cements (SRC). However, such cements may provide inferior physical properties to conventional compositions.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to cementing compositions that include a sulfate-resistant cement and fly ash. The sulfate-resistant cement may contain calcium magnesium aluminum oxide silicate, brownmillerite, dolomite, periclase, and quartz. The composition may contain the fly ash in an amount in the range of 10 to 40 wt. %.

In another aspect, embodiments disclosed herein relate to cementing slurries that include a cement composition, containing a sulfate-resistant cement and fly ash, and water. The cement composition may include the fly ash in an amount in the range of 10 to 40 wt. %, and the sulfate-resistant cement may contain calcium magnesium aluminum oxide silicate, brownmillerite, dolomite, periclase, and quartz.

In another aspect, embodiments disclosed herein relate to methods of cementing a wellbore. The methods include forming a cementing slurry by mixing water with a cement composition that comprises a sulfate-resistant cement and fly ash, pumping the cementing slurry to a selected location within the wellbore, and curing the cementing slurry at the selected location to give a concrete structure. The cement composition may contain the fly ash in an amount in the range of 10 to 40 wt. %, and the sulfate-resistant cement may include calcium magnesium aluminum oxide silicate, brownmillerite, dolomite, periclase, and quartz.

In a further aspect, embodiments disclosed herein relate to methods of preparing a cementing composition. The methods include mixing calcium magnesium aluminum oxide silicate, brownmillerite, dolomite, periclase, and quartz to give a sulfate-resistant cemen, and mixing the sulfate resistant cement with fly ash. The composition may contain the fly ash in an amount in the range of 10 to 40 wt. %.

Other aspects and advantages of the claimed subject matter will be apparent from the following description and the appended claims.

DETAILED DESCRIPTION

Embodiments in accordance with the present disclosure generally relate to cement compositions, cement slurries, and concrete structures that include fly ash and are resistant to sulfates. The cement compositions, cement slurries, and concrete structures of one or more embodiments may be used as a sulfate-resistant cement in oil and gas applications, and may provide improved wellbore integrity. Some embodiments in accordance with the present disclosure are directed to methods of cementing a wellbore.

Cementing is one of the most important operations in both drilling and completion of the wellbore. Primary cementing occurs at least once to secure a casing to the borehole wall.

In particular, primary cementing forms a protective solid sheath around the exterior surface of the introduced fluid conduit by positioning cement slurry in the annulus between the borehole wall and the casing. Upon positioning the casing in a desirable location in the wellbore, introducing cement slurry into the wellbore fills at least a portion, if not all, of the wellbore annulus. When the cement slurry cures, the cement physically and chemically bonds with both the exterior surface of the casing and the borehole wall, such as a geological formation, coupling the two. In addition, the solid cement provides a physical barrier that prohibits gases and liquids from migrating from one side of the solid cement to the other via the wellbore annulus.

In one or more embodiments, a cement composition in accordance with the present disclosure may contain a sulfate-resistant cement and fly ash.

In some embodiments, the cement composition may contain the fly ash in an amount of the range of about 10 to 50% by weight (wt. %). For example, the cement composition may contain the fly ash in an amount of a range having a lower limit of any of 10, 15, 20, 25, 30, and 35 wt. % to an upper limit of any of 25, 30, 35, 40, 45, and 50 wt. %, where any lower limit can be used in combination with any mathematically-compatible upper limit. In some embodiments, the cement composition may contain the fly ash in an amount of about 30 wt. %.

In one or more embodiments, the sulfate-resistant cement may contain calcium magnesium aluminum oxide silicate ($Ca_{54}MgAlSi_{16}O_{90}$). In some embodiments, the sulfate-resistant cement may contain the calcium magnesium aluminum oxide silicate in an amount of the range of about 45 to 60% by weight (wt. %). For example, the sulfate-resistant cement may contain the calcium magnesium aluminum oxide silicate in an amount of a range having a lower limit of any of 45, 48, 50, 51, and 52 wt. % to an upper limit of any of 51, 52, 53, 55, 57, and 60 wt. %, where any lower limit can be used in combination with any mathematically-compatible upper limit. In some embodiments, the sulfate-resistant cement may contain the calcium magnesium aluminum oxide silicate in an amount of about 51 wt. %.

In one or more embodiments, the sulfate-resistant cement may contain brownmillerite ($Ca_2(Al,Fe)_2O_5$). In some embodiments, the sulfate-resistant cement may contain the brownmillerite in an amount of the range of about 15 to 25 wt. %. For example, the sulfate-resistant cement may contain the brownmillerite in an amount of a range having a lower limit of any of 15, 17, 19, and 20 wt. % to an upper limit of any of 20, 21, 23, and 25 wt. %, where any lower limit can be used in combination with any mathematically-compatible upper limit. In some embodiments, the sulfate-resistant cement may contain the brownmillerite in an amount of about 19 wt. %.

In one or more embodiments, the sulfate-resistant cement may contain dolomite ($CaMg(CO_3)_2$). In some embodiments, the sulfate-resistant cement may contain the dolomite in an amount of the range of about 5 to 15 wt. %. For example, the sulfate-resistant cement may contain the dolomite in an amount of a range having a lower limit of any of 5, 7, 9, and 10 wt. % to an upper limit of any of 9, 10, 11, 13, and 15 wt. %, where any lower limit can be used in combination with any mathematically-compatible upper limit. In some embodiments, the sulfate-resistant cement may contain the dolomite in an amount of about 9 wt. %.

In one or more embodiments, the sulfate-resistant cement may contain periclase (MgO). In some embodiments, the sulfate-resistant cement may contain the periclase in an amount of the range of about 5 to 15 wt. %. For example, the sulfate-resistant cement may contain the periclase in an amount of a range having a lower limit of any of 5, 7, 9, 10, 11, and 12 wt. % to an upper limit of any of 12, 13, 14, and 15 wt. %, where any lower limit can be used in combination with any mathematically-compatible upper limit. In some embodiments, the sulfate-resistant cement may contain the periclase in an amount of about 12 wt. %.

In one or more embodiments, the sulfate-resistant cement may contain little to no calcium aluminium oxide ($Ca_3Al_2O_6$). In some embodiments, the sulfate-resistant cement may contain the calcium aluminum oxide in an amount of 3 wt. % or less, 2 wt. % or less, 1 wt. % or less, or 0.5 wt. % or less. In some embodiments, the sulfate-resistant cement may contain the calcium aluminium oxide in an amount of a range having a lower limit of any of 0.01, 0.1, 0.2, 0.5, 1.0, 1.5, and 2.0 wt. % to an upper limit of any of 0.5, 1.0, 1.5, 2.0, 2.5, and 3.0 wt. %, where any lower limit can be used in combination with any mathematically-compatible upper limit.

In one or more embodiments, the sulfate-resistant cement may contain quartz ($SiO_2$). In some embodiments, the sulfate-resistant cement may contain the quartz in an amount of the range of about 2 to 12 wt. %. For example, the sulfate-resistant cement may contain the quartz in an amount of a range having a lower limit of any of 2, 4, 6, and 7 wt. % to an upper limit of any of 7, 8, 10, and 12 wt. %, where any lower limit can be used in combination with any mathematically-compatible upper limit. In some embodiments, the sulfate-resistant cement may contain the quartz in an amount of about 7 wt. %.

A cement slurry of one or more embodiments may include water and a cement composition as discussed above. The water may include at least one of fresh water, seawater, and brine. The cement slurry may contain fresh water formulated to contain various salts. The salts may include, but are not limited to, alkali metal halides and hydroxides. In one or more embodiments, brine may be any of seawater, aqueous solutions wherein the salt concentration is less than that of seawater, or aqueous solutions wherein the salt concentration is greater than that of seawater. Salts that are found in seawater may include sodium, calcium, aluminum, magnesium, potassium, strontium, and lithium salts of halides, carbonates, chlorates, bromates, nitrates, oxides, phosphates, among others. Any of the aforementioned salts may be included in brine. In one or more embodiments, the density of the cement composition may be controlled by increasing the salt concentration in the brine, though the maximum concentration is determined by the solubility of the salt. In particular embodiments, brines may include an alkali metal halide or carboxylate salt and/or alkaline earth metal carboxylate salts.

In one or more embodiments, the cement slurry may contain the cement composition in an amount in the range of about 40 to 90 wt. % of the total weight of the cement slurry. For example, the cement slurry may contain the cement composition in an amount of a range from a lower limit of any of 40, 50, 60, 65 70, and 80 wt. % to an upper limit of any of 50, 60, 70, 75, 80, and 90 wt. %, where any lower limit can be used in combination with any mathematically-compatible upper limit.

In one or more embodiments, the cement slurry may contain the water in an amount in the range of about 5 to 60 wt. % of the total weight of the cement slurry. For example, the cement slurry may contain the water in an amount of a range from a lower limit of any of 5, 10, 15, 20, 25, 30, 40 and 50 wt. % to an upper limit of any of 10, 20, 30, 40, 50, and 60 wt. %, where any lower limit can be used in combination with any mathematically-compatible upper limit.

In one or more embodiments, the cement slurry may further include one or more additives. In some embodiments, one such additive may be an expansion additive. The expansion additive of one or more embodiments may be used to improve the bonding of the cement to a wellbore. As a cement dehydrates its volume decreases, which may result in a separation or weakened bond between the cement and a casing or the cement and a geological formation. Expansion additives counteract this by increasing the volume of the cement and maintaining bonding during dehydration. At wellbore temperatures of 140° F. or greater, at least one of MgO, CaO, and mixtures thereof may be used as the expansion additive in the cement slurry. However, at temperatures less than 140° F., MgO may not expand quickly enough to provide adequate binding to the geological formation. Accordingly, at wellbore temperatures of less than 140° F., crystalline SiO, may be used as the expansion additive as it expands more quickly than MgO. In one or more embodiments, D174 (Schlumberger) may be used as a low-temperature expansion additive (for instance, at temperatures of less than 230° F.), Microbond L (Halliburton) may be used as a low-temperature expansion additive (such as, at temperatures less than 230° F.), Halliburton Microbond HT may be used as a high-temperature expansion additive (such as, at temperatures greater than 230° F.), and Schlumberger D 176 can be used as a high temperature expansion additive (such as, at temperatures greater than 230° F.).

In one or more embodiments, the cement slurry may contain the expansion additive in an amount of 0.01 to 0.5 wt. %, based on the total weight of the cement slurry. For example, the cement slurry may contain the expansion additive in an amount of a range from a lower limit of any of 0.01, 0.02, 0.03, 0.05, 0.07, 0.10, and 0.2 wt. % to an upper limit of any of 0.05, 0.07, 0.10, 0.15, 0.2, 0.3, 0.4, and 0.5 wt. %, where any lower limit can be used in combination with any mathematically-compatible upper limit.

In one or more embodiments, an additive may include a retarder. The retarder of some embodiments may extend or retard the setting time of the cement slurry so that there is adequate pumping time in which to locate the cement slurry. The retarder may be any suitable known to one of ordinary skill in the art. In particular embodiments, the retarder may be an lignosulfonate retarder, such as HR®-5 (Halliburton).

In one or more embodiments, the cement slurry may contain the retarder in an amount of 0.1 to 1.0 wt. %, based on the total weight of the cement slurry. For example, the cement slurry may contain the retarder in an amount of a range from a lower limit of any of 0.1, 0.2, 0.3, 0.5, and 0.6 wt. % to an upper limit of any of 0.2, 0.3, 0.5, 0.6, 0.8, and 1.0 wt. %, where any lower limit can be used in combination with any mathematically-compatible upper limit.

In one or more embodiments, the cement slurry may contain the one or more additives in a total amount of 0.01 to 40 wt. %, based on the total weight of the cement slurry. For example, the cement slurry may contain the one or more additives in an amount of a range from a lower limit of any of 0.01, 0.05, 0.1, 0.5, 1, 2, 3, 5, 7, 10, 15, 20, 25, and 30 wt. % to an upper limit of any of 0.1, 0.2, 0.5, 1, 2, 4, 5, 6, 8, 10, 20, 30, and 40 wt. %, where any lower limit can be used in combination with any mathematically-compatible upper limit.

The cement slurry of one or more embodiments may have an API thickening time of 90 minutes or more to a consistency of 50 Bc, under wellbore conditions (pressure and temperature). In some embodiments, the cement slurry may have an API thickening time of 90 minutes or more, 100 minutes or more, 105 minutes or more, 110 minutes or more, 120 minutes or more, 240 minutes or more, or 360 minutes or more.

The cement slurry of one or more embodiments may form cement through curing or solidifying. As used herein, "curing" refers to providing adequate conditions (such as humidity, temperature, and time) to allow the concrete to achieve the desired properties (such as hardness) for its intended use through one or more reactions between the water and the cement composition. Curing may be a passive step where no physical action is needed (such as cement that cures in ambient conditions when untouched). In contrast, "drying" refers to merely allowing the concrete to achieve conditions appropriate for its intended use, which may only involve physical state changes, as opposed to chemical reactions. In some embodiments, "curing the cement slurry" may refer to passively allowing the cement slurry to harden or cure through allowing one or more reactions between the water and the cement composition. In some embodiments, suitable curing conditions may be ambient conditions. In or more embodiments, curing may also involve actively hardening or curing the cement slurry by, for instance, introducing a curing agent to the cement slurry, providing heat or air to the cement slurry, manipulating the environmental conditions of the cement slurry to facilitate reactions between the water and the cement precursor, a combination of these, or other such means.

In one or more embodiments, curing may occur at a relative humidity of greater than or equal to 50% in the cement slurry and a temperature of greater than or equal to 50° F., for a time period of from 1 to 14 days. For example, the cement slurry may cure at a relative humidity of 50% or more, 60% or more, 70% or more, 80% or more, or 90% or more. The cement slurry may be cured at temperatures of 50° F. or more, 70° F. or more, 90° F. or more, or 110° F. or more. The cement slurry may be cured for a duration of a range from a lower limit of any of 1, 2, 3, 4, and 7 days to an upper limit of any of 2, 5, 7, 10, and 14 days, where any lower limit can be used in combination with any mathematically-compatible upper limit.

Once the cement slurry is cured, the cured cement constitutes a cement structure. In one or more embodiments, the cement slurry is cured within a wellbore, and the cement structure is located within the wellbore. The cement structure will have various properties that indicate the physical strength and flexibility of the cement structure.

For instance, Young's modulus can quantify the elasticity or stiffness of the cement structure within the wellbore and gives insight into the tensile strength of the cement structure. Poisson's ratio is a measure of transverse strain to axial strain, and measures the deformation capacity of the cement structure. The greater the deformation capacity (that is, the greater Poisson's ratio) the less likely the cement structure will be damaged as temperature and pressure changes within the wellbore. The Young's modulus and Poisson's ratio may be measured 10 days after curing the cement structure, 20 days after curing the cement structure, and 30 days after curing the cement structure.

In one or more embodiments, the static Young's modulus of the cement structure may be in the range of about 0.80 to $1.20 \times 10^6$ psi. For example, the cement structure may have a Young's modulus of a range from a lower limit of any of 0.80, 0.90, 0.95, 1.0, 1.05, and $1.10 \times 10^6$ psi to an upper limit of any of 0.95, 1.0, 1.05, 1.1, 1.15, and $1.20 \times 10^6$ psi, where any lower limit can be used in combination with any mathematically-compatible upper limit.

In one or more embodiments, the static Poisson's ratio of the cement structure may be in the range of about 0.120 to 0.140 psi. For example, the cement structure may have a static Poisson's ratio of a range from a lower limit of any of 0.120, 0.122, 0.124, 0.126, and 0.130 psi to an upper limit of any of 0.130, 0.132, 0.134, 0.136, and 0.140 psi, where any lower limit can be used in combination with any mathematically-compatible upper limit.

In one or more embodiments, the density of the cement structure may be in the range of about 1.80 to 2.20 g/mL. For example, the cement structure may have a static Poisson's ratio of a range from a lower limit of any of 1.80, 1.85, 1.90, 1.95, and 2.00 g/mL to an upper limit of any of 2.00, 2.05, 2.10, 2.15, and 2.20 g/mL, where any lower limit can be used in combination with any mathematically-compatible upper limit.

In one or more embodiments, the compressive strength of the cement structure may be 1000 psi or more, 1500 psi or more, 2000 psi or more, or 2500 psi or more. In some embodiments, the compressive strength of the cement structure may be in the range of about 500 to 5000 psi. For example, the cement structure may have a compressive strength of a range from a lower limit of any of 500, 1000, 1500, 2000, 2500, and 3000 psi to an upper limit of any of 1000, 1500, 2000, 2500, 3000, 3500, 4000, 4500, and 5000 psi, where any lower limit can be used in combination with any mathematically-compatible upper limit.

The cement compositions, slurries, and concrete structures of the present disclosure may be used in oil and gas applications. In some embodiments, the compositions and methods disclosed herein may be used in wellbores. Specifically, a cement slurry may be prepared and pumped to a chosen location within the wellbore. The cement may cure within the wellbore, forming a concrete structure therewithin.

Examples

The following examples are merely illustrative and should not be interpreted as limiting the scope of the present disclosure.

A sulfate-resistant cement (SRC) was prepared. Analysis by X-ray diffraction revealed that the SRC possessed the chemical composition reported in Table 1. A cement composition (Example 1) was prepared by mixing the SRC with 30 wt. % fly ash.

TABLE 1

Composition of SRC

| Compound | Amount (wt. %) |
| --- | --- |
| Calcium magnesium aluminum oxide silicate-Brownmillerite | 51 |
|  | 19 |
| Dolomite-CaMg(CO$_3$)$_2$ | 9 |
| Periclase | 12 |
| Calcium aluminum oxide | 2 |
| Quartz | 7 |

Figure 1:
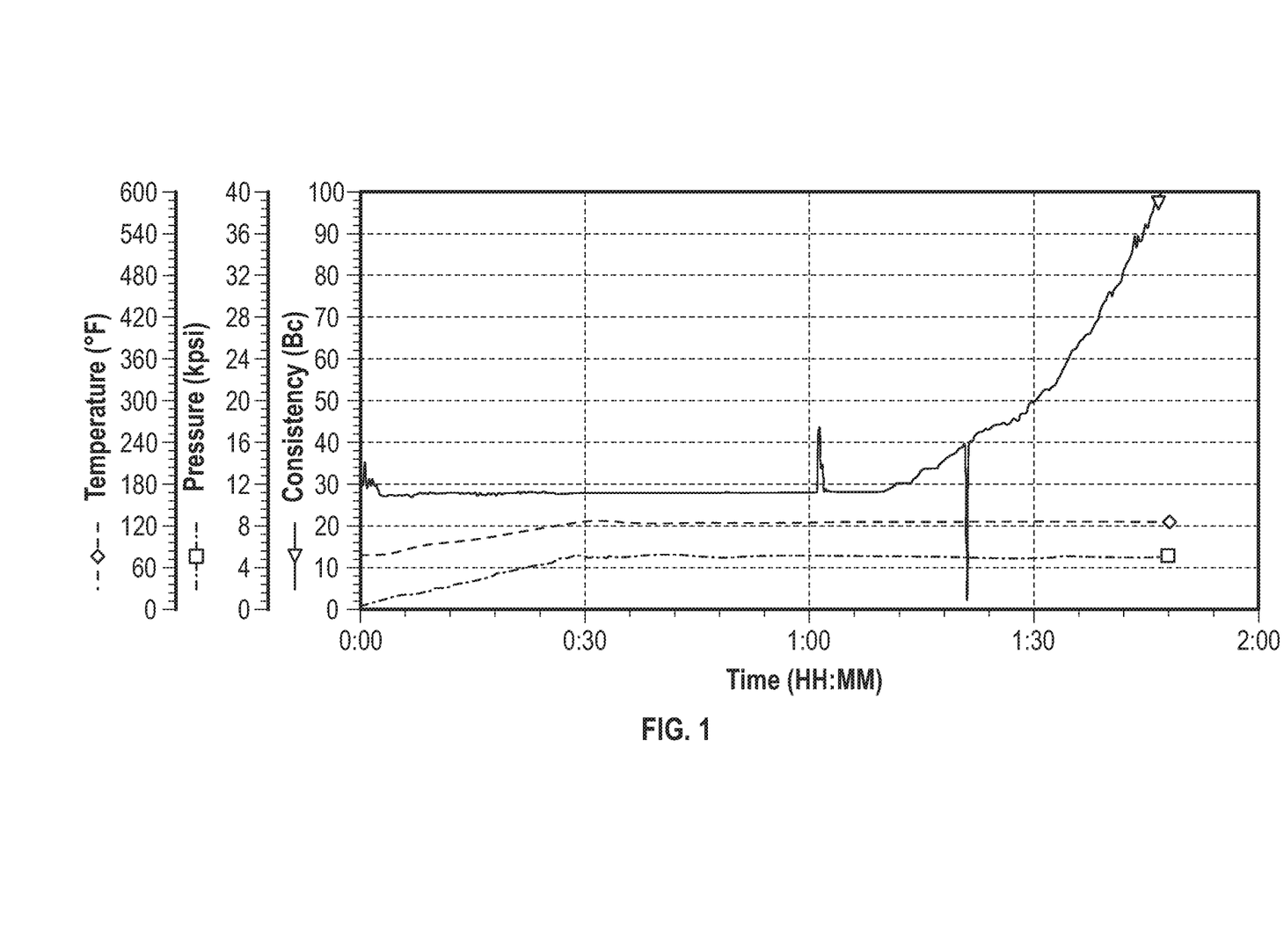
FIG. 1 is a graphical depiction of an API thickening test of an exemplary SRC of one or more embodiments.

A SRC slurry was prepared by mixing 342 g water with 800 g cement composition (Example 1). The slurry had a density of 120 pounds per cubic foot (pcf; 16.04 lb/gallon). An API thickening time test was performed under ramping of 28 minutes, a pressure of 5200 psi, and a temperature of 125° F., providing a thickening time of 105 minutes (see FIG. 1). The sample provided the rheology data exhibited in Table 2.

TABLE 2

Rheology of SRC

| | |
| --- | --- |
| 600 rpm | 162 |
| 300 rpm | 115 |
| 200 rpm | 97 |
| 100 rpm | 75 |
| 6 rpm | 25 |
| 3 rpm | 19 |
| 10 second gel strength (lb/100 ft$^2$) | 20 |
| 10 minute gel strength (lb/100 ft$^2$) | 27 |
| Plastic Viscosity (cP) | 47 |
| Yield Point (lb/100 ft$^2$) | 68 |

Figure 2:
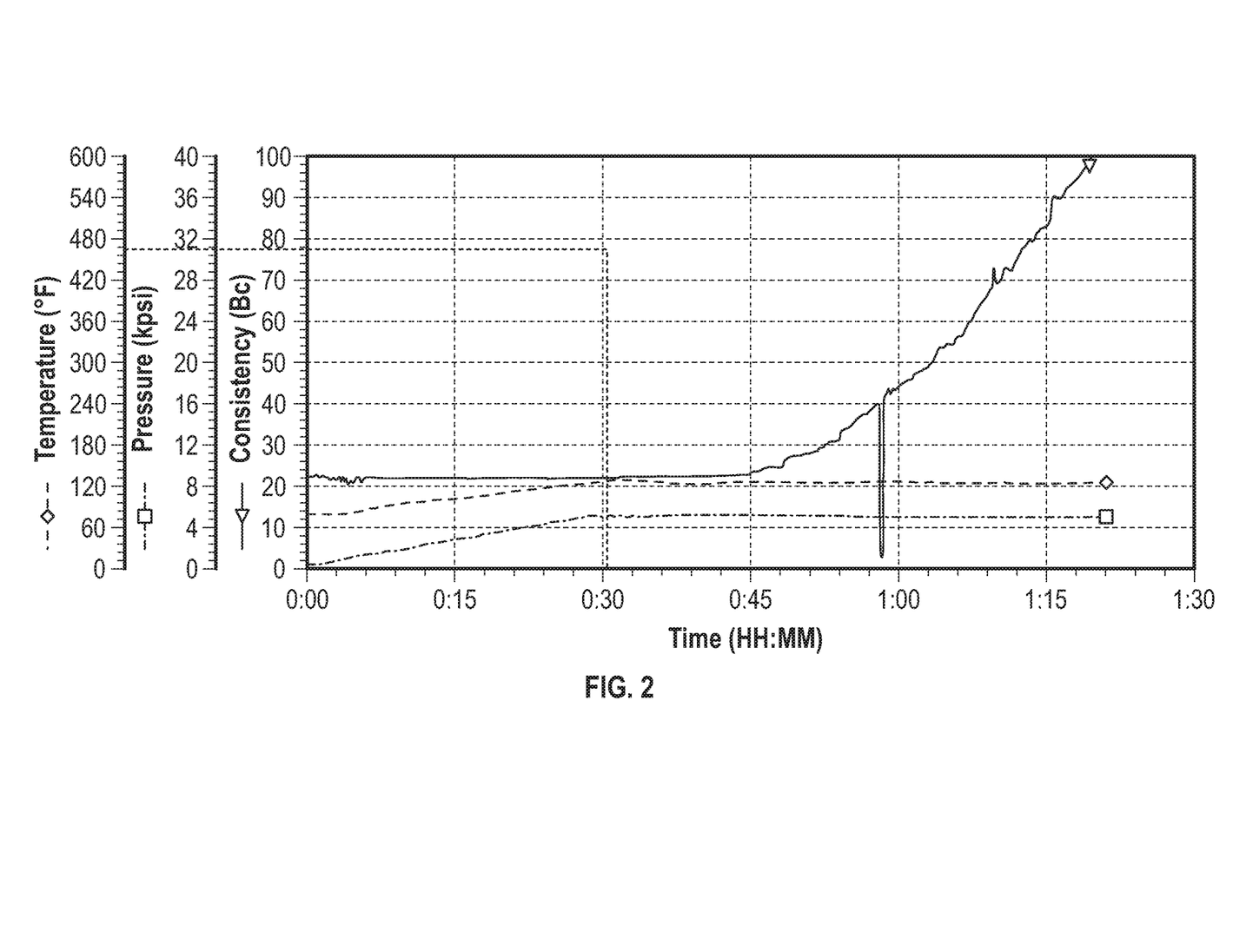
FIG. 2 is a graphical depiction of an API thickening test of a comparative ordinary Portland cement (OPC).

A comparative ordinary Portland cement (OPC) slurry was prepared by mixing 337 g water with 800 g cement. The slurry had a density of 120 pounds per cubic foot (pcf; 16.04 lb/gallon). An API thickening time test was performed under the conditions outlined above, providing a thickening time of 82 minutes (see FIG. 2). The sample provided the rheology data exhibited in Table 3.

TABLE 3

Rheology of OPC

| | |
| --- | --- |
| 600 rpm | 134 |
| 300 rpm | 104 |
| 200 rpm | 89 |
| 100 rpm | 74 |
| 6 rpm | 25 |
| 3 rpm | 13 |
| 10 second gel strength (lb/100 ft$^2$) | 18 |

TABLE 3-continued

Rheology of OPC

| | |
| --- | --- |
| 10 minute gel strength (lb/100 ft$^2$) | 28 |
| Plastic Viscosity (cP) | 30 |
| Yield Point (lb/100 ft$^2$) | 74 |

Figure 3:
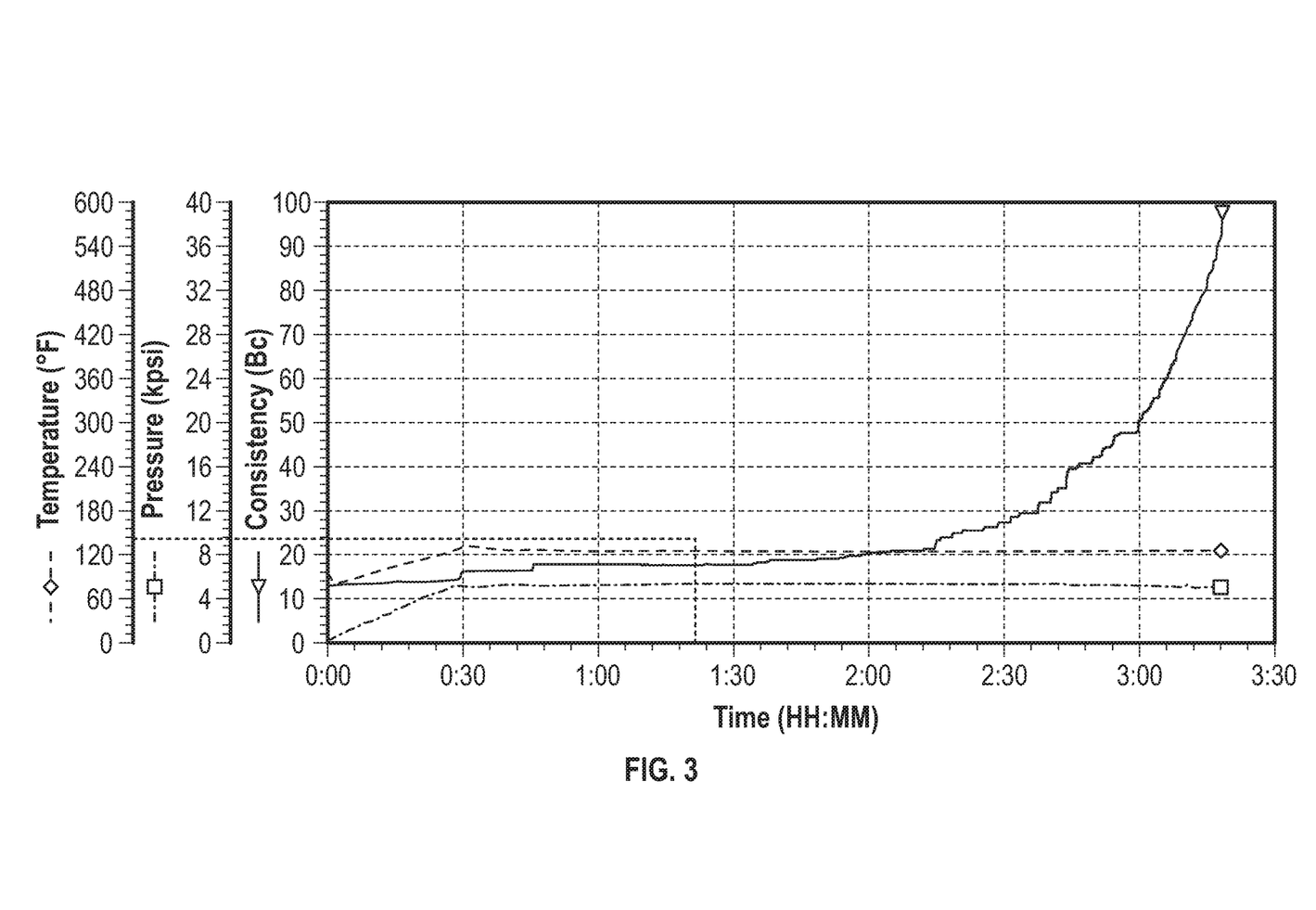
FIG. 3 is a graphical depiction of an API thickening test of an exemplary SRC of one or more embodiments with a retarder.
Figure 4:
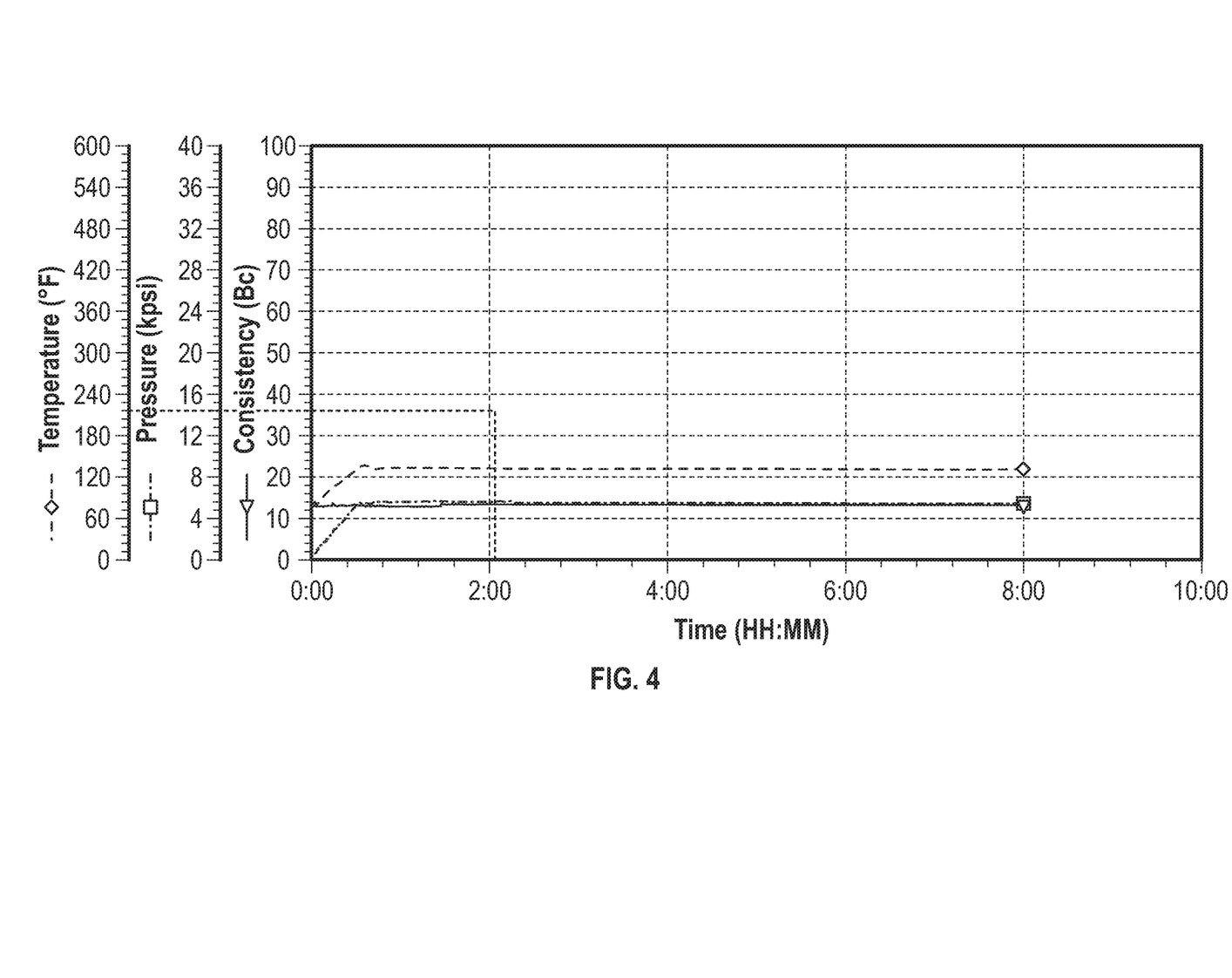
FIG. 4 is a graphical depiction of an API thickening test of an exemplary SRC of one or more embodiments with a retarder.
Figure 5:
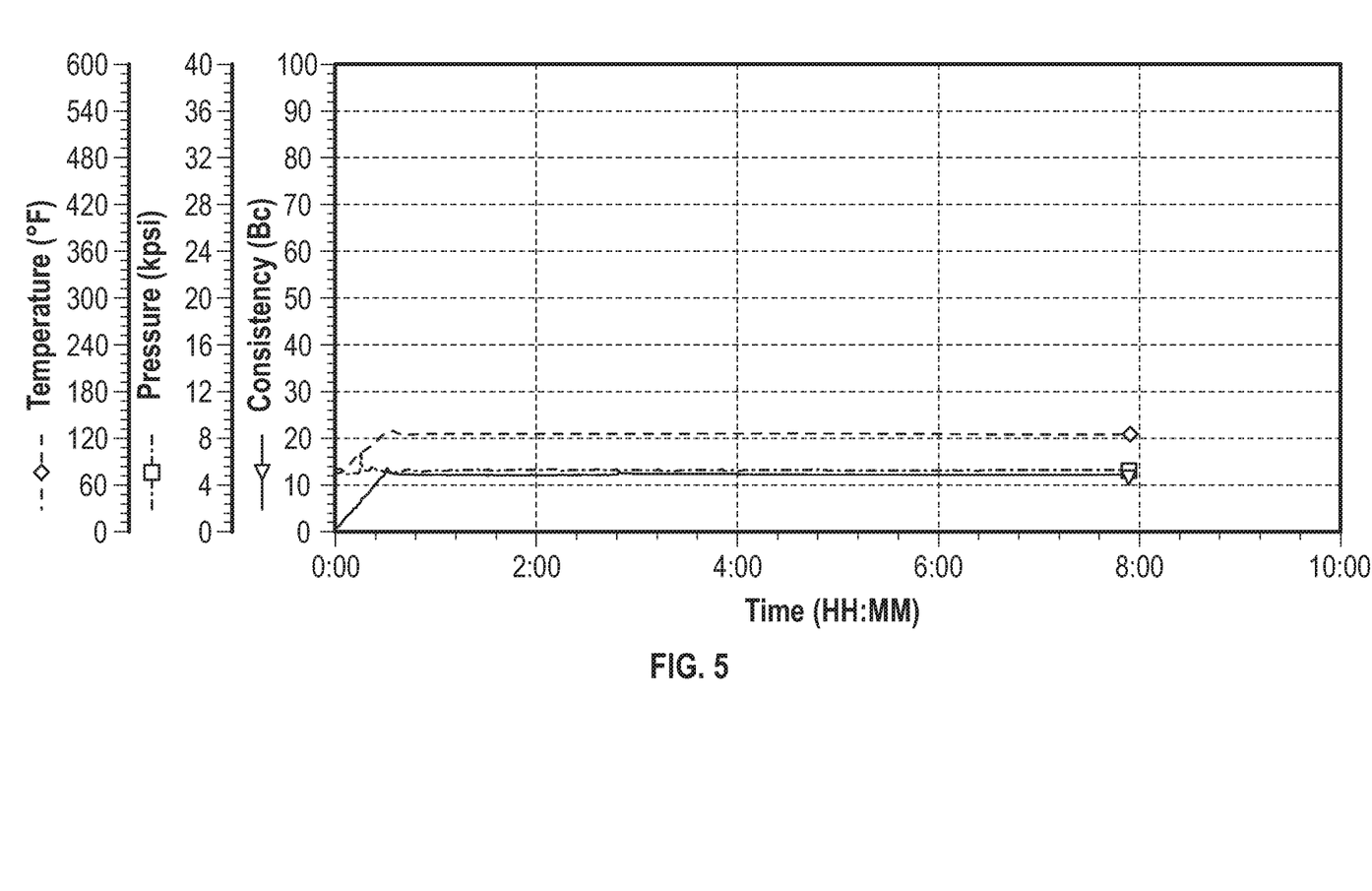
FIG. 5 is a graphical depiction of an API thickening test of an exemplary SRC of one or more embodiments with a retarder.

The retarder response of the SRC was measured to determine the length of time the slurry remains in a pumpable fluid state under simulated wellbore conditions (of temperature and pressure). The thickening time was measure in accordance with API RP 10B. The test slurry was evaluated in a pressurized consistometer. Three tests were performed using different amounts of retarder. The retarder was HRC)-5 (Halliburton). The results show excellent retarder response of SRC (see FIGS. 3-5 and Tables 4-6, below).

TABLE 4

Retarder Test 1 (302 g water, 2 g HR ®-5, 800 g Example 1)

| Cement | Example 1 |
| --- | --- |
| Thickening Time | 3:17 hours |
| Bottom Hole Circulating Temp. (BHCT) | 125° F. |
| Batch mixing | — |
| Test Temperature | 125° F. |
| Ramp Time | 28 min |
| Final Bourdon Consistency | 100 Bc |
| Pressure | 5200 psi |
| Density | 120 pcf |

TABLE 5

Retarder Test 2 (302 g water, 4.0 g HR ®-5, 800 g SRC)

| Cement | Example 1 |
| --- | --- |
| Thickening Time | 8:00 hours |
| BHCT | 125° F. |
| Batch mixing | — |
| Test Temperature | 125° F. |
| Ramp Time | 28 min |
| Final Bourdon Consistency | 13 Bc |
| Pressure | 5200 psi |
| Density | 120 pcf |

TABLE 6

Retarder Test 3 (302 g water, 4.8 g HR ®-5, 800 g SRC)

| Cement | Example 1 |
| --- | --- |
| Thickening Time | 7:51 hours |
| BHCT | 125° F. |
| Batch mixing | — |
| Test Temperature | 125° F. |
| Ramp Time | 28 min |
| Final Bourdon Consistency | 12 Bc |
| Pressure | 5200 psi |
| Density | 120 pcf |

Figure 6A:
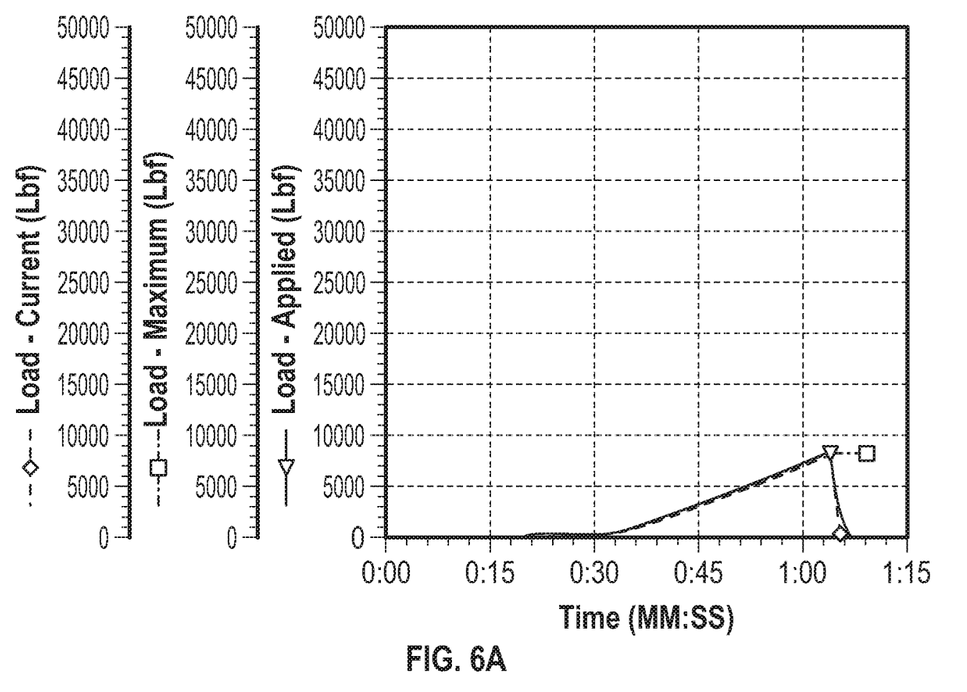
FIGS. 6A-C are graphical depictions of compressive strength tests of an exemplary SRC of one or more embodiments.
Figure 6B:
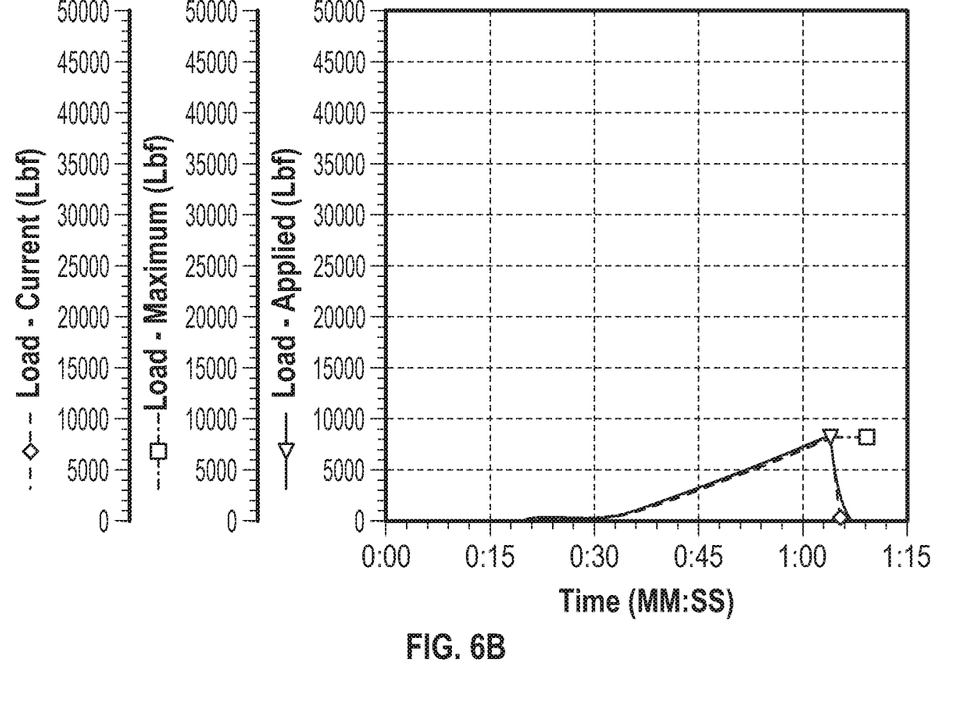
Figure 6C:
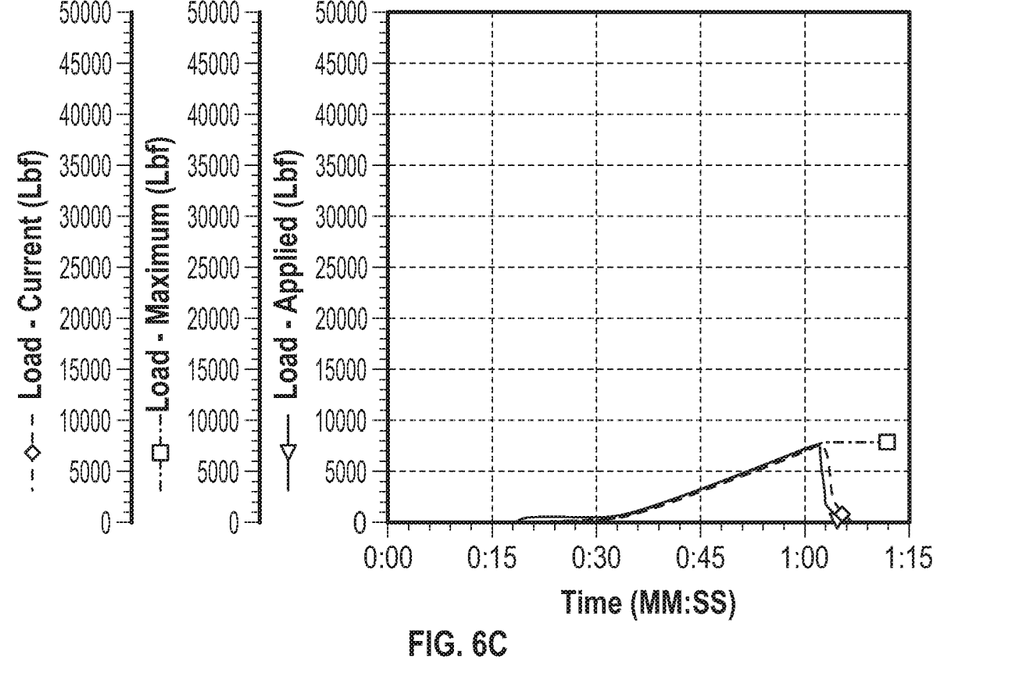
Figure 7A:
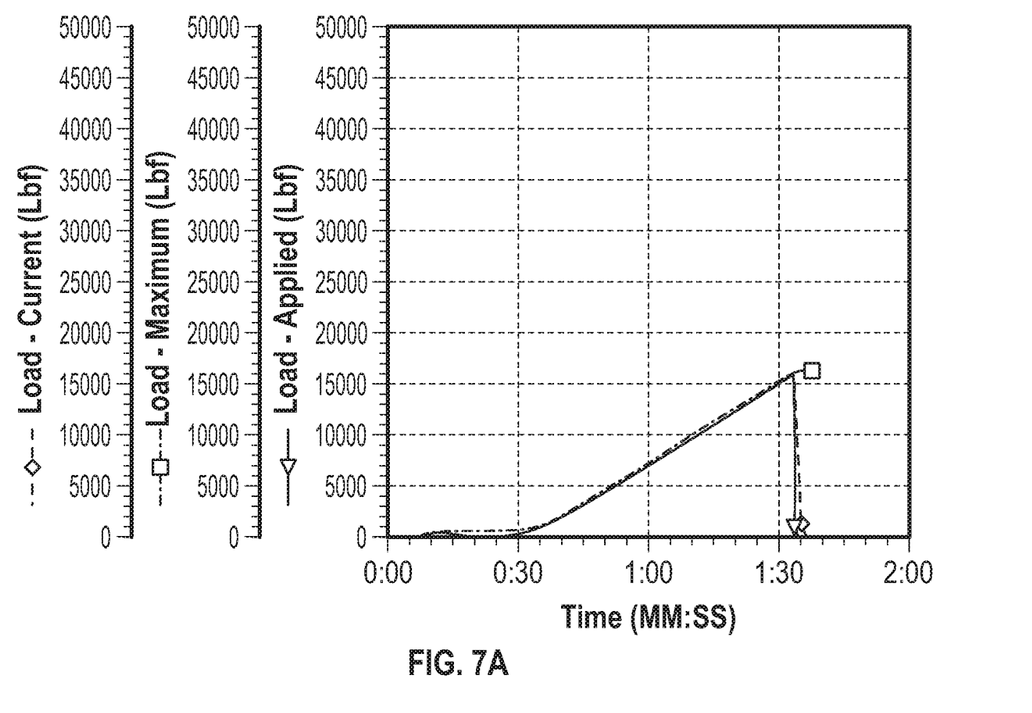
FIGS. 7A-C are graphical depictions of compressive strength tests of a comparative OPC.
Figure 7B:
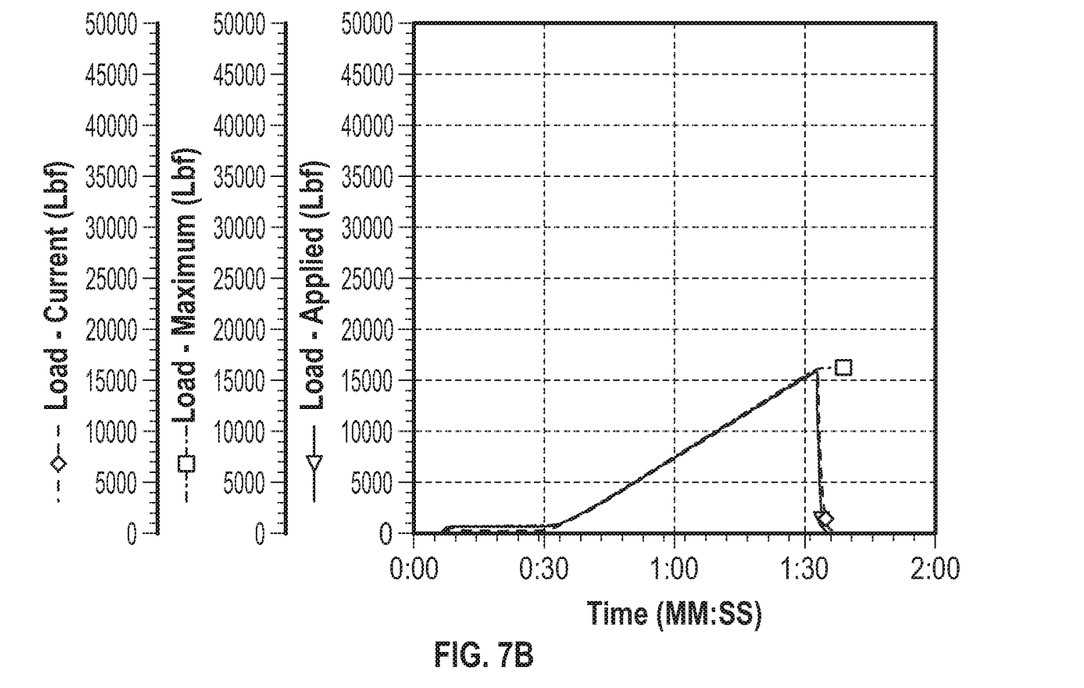
Figure 7C:
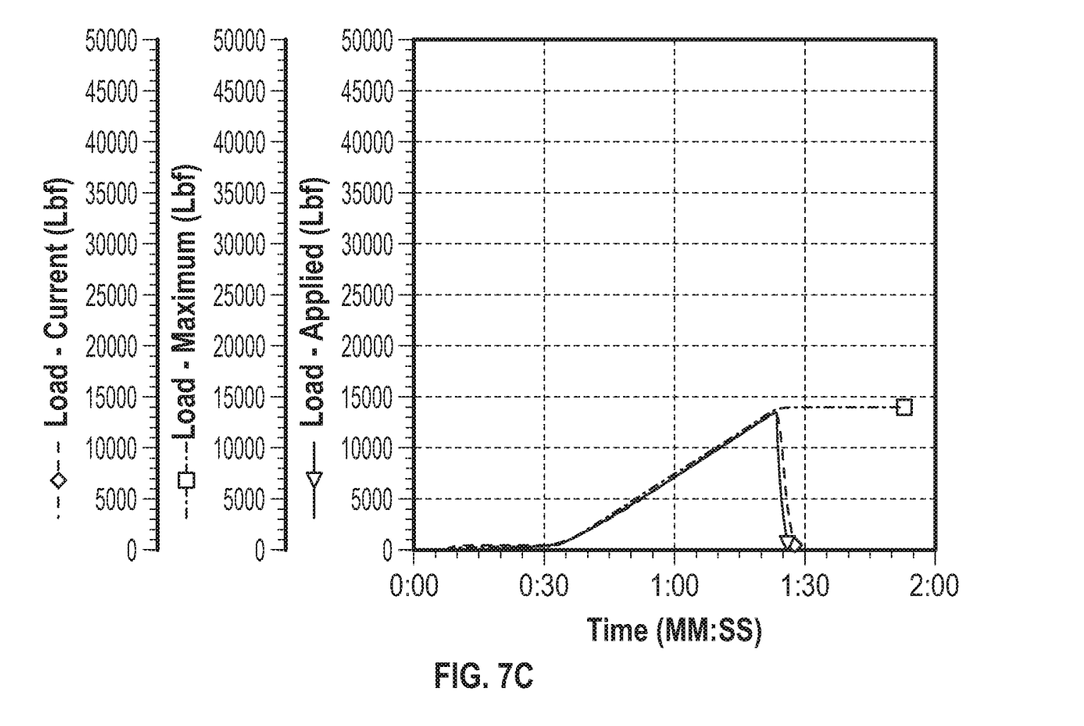

Compressive strength tests were performed on the exemplary SRC cement and the comparative OPC cement discussed above. The SRC cement provided an average compressive strength of 2044 psi (see FIGS. 6A-C) and the OPC cement provided an average compressive strength of 3861 psi (see FIGS. 7A-C).

Expansion tests were performed on the above-discussed SRC cement (and a conventional (comparative) Class G cement. The Class G cement used contained 63 wt. % tricalcium silicate, 16.23 wt. % dicalcium silicate, 14.6 wt. % tetracalcium aluminoferrite, 2.5 wt. % tricalcium aluminate, 1.81 wt. % periclase, and 1.86% sulfur trioxide. Magnesium oxide was used as the expansion additive (Halliburton; Microbond HT). The expansion tests were performed at a temperature of 285° F., a pressure of 3000 psi, and a ramping of 2 hours.

TABLE 7

SRC Expansion Test (302 g water, 0.2 g D Air 300, 8 g MgO, 800 g Example 1)

| Day | Measurement (mm) | Linear Expansion % | Comments |
|---|---|---|---|
| 0 | 11.165 | 0 | Water curing to make cement set |
| 1 | 12.328 | 0.416 | 285° F. |
| 2 | 16.1 | 1.593 | 285° F. |

TABLE 8

Class G Expansion Test (340.74 g water, 0.2 g D Air 300, 8.12 g MgO, 812.11 g Class G)

| Day | Measurement (mm) | Linear Expansion % | Comments |
|---|---|---|---|
| 0 | 11.144 | 0 | Water curing to make cement set |
| 1 | 11.9341 | 0.283 | 285° F. |
| 2 | 12.263 | 0.401 | 285° F. |

The SRC of the present disclosure therefore shows an excellent API thickening time test result, with a thickening time longer than that of an OPC. The SRC also exhibits a good compressive strength. In addition, the proposed SRC provides better expansion results as compared to a conventional Class G cement. With the same amount of expansion additive, the SRC is able to expand four times as much as the Class G cement.

Although the preceding description has been described herein with reference to particular means, materials and embodiments, it is not intended to be limited to the particulars disclosed herein; rather, it extends to all functionally equivalent structures, methods and uses, such as are within the scope of the appended claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed is:

1. A cementing composition, comprising:
   a sulfate-resistant cement that comprises:
      calcium magnesium aluminum oxide silicate;
      brownmillerite;
      dolomite;
      periclase; and
      quartz; and
   fly ash,
   wherein the composition contains the fly ash in an amount in the range of 10 to 40 wt. %.

2. The composition according to claim 1, wherein the sulfate-resistant cement contains the calcium magnesium aluminum oxide silicate in an amount of the range of 45 to 60 wt. %.

3. The composition according to claim 1, wherein the sulfate-resistant cement contains the brownmillerite in an amount of the range of 15 to 25 wt. %.

4. The composition according to claim 1, wherein the sulfate-resistant cement contains the dolomite in an amount of the range of 5 to 15 wt. %.

5. The composition according to claim 1, wherein the sulfate-resistant cement contains the periclase in an amount of the range of 5 to 15 wt. %.

6. The composition according to claim 1, wherein the sulfate-resistant cement contains calcium aluminum oxide in an amount of 3 wt. % or less.

7. A cementing slurry, comprising:
   a cement composition that comprises a sulfate-resistant cement and fly ash; and
   water;
   wherein the cement composition contains the fly ash in an amount in the range of 10 to 40 wt. %, and
   wherein the sulfate-resistant cement comprises calcium magnesium aluminum oxide silicate, brownmillerite, dolomite, periclase, and quartz.

8. The cementing slurry according to claim 7, wherein the cement slurry contains the cement composition in an amount in the range of about 40 to 90 wt. %.

9. The cementing slurry according to claim 7, wherein the cementing slurry contains one or more additives selected from the group consisting of expansion additives, weighting agents, dispersants, and fluid loss additives.

10. The cementing slurry according to claim 7, wherein the sulfate-resistant cement contains the calcium magnesium aluminum oxide silicate in an amount of the range of 45 to 60 wt. %.

11. The cementing slurry according to claim 7, wherein the sulfate-resistant cement contains the brownmillerite in an amount of the range of 15 to 25 wt. %.

12. The cementing slurry according to claim 7, wherein the sulfate-resistant cement contains the dolomite in an amount of the range of 5 to 15 wt. %.

13. The cementing slurry according to claim 7, wherein the sulfate-resistant cement contains the periclase in an amount of the range of 5 to 15 wt. %.

14. The cementing slurry according to claim 7, wherein the sulfate-resistant cement contains calcium aluminum oxide in an amount of 3 wt. % or less.

15. A method of cementing a wellbore, comprising:
   forming a cementing slurry by mixing water with a cement composition that comprises a sulfate-resistant cement and fly ash;
   pumping the cementing slurry to a selected location within the wellbore; and
   curing the cementing slurry at the selected location to give a concrete structure, wherein the cement composition contains the fly ash in an amount in the range of 10 to 40 wt. %, and wherein the sulfate-resistant cement comprises calcium magnesium aluminum oxide silicate, brownmillerite, dolomite, periclase, and quartz.

16. The method according to claim 15, wherein the concrete structure has a compressive strength of 1500 psi or more.

17. The method according to claim 15, wherein the forming the cementing slurry further comprises mixing one or more additives selected from the group consisting of expansion additives, weighting agents, dispersants, and fluid loss additives with the sulfate-resistant cement and the fly ash.

18. The method according to claim 15, wherein the sulfate-resistant cement contains the calcium magnesium aluminum oxide silicate in an amount of the range of 45 to 60 wt. %.

19. The method according to claim 15, wherein the sulfate-resistant cement contains the brownmillerite in an amount of the range of 15 to 25 wt. %.

20. The method according to claim 15, wherein the sulfate-resistant cement contains the dolomite in an amount of the range of 5 to 15 wt. %.

21. The method according to claim 15, wherein the sulfate-resistant cement contains the periclase in an amount of the range of 5 to 15 wt. %.

22. The method according to claim 15, wherein the sulfate-resistant cement contains calcium aluminum oxide in an amount of 3 wt. % or less.

23. A method of preparing a cementing composition, comprising:

mixing calcium magnesium aluminum oxide silicate, brownmillerite, dolomite, periclase, and quartz to give a sulfate-resistant cement; and mixing the sulfate resistant cement with fly ash, wherein the composition contains the fly ash in an amount in the range of 10 to 40 wt. %.

24. The method according to claim 23, wherein the sulfate-resistant cement contains the calcium magnesium aluminum oxide silicate in an amount of the range of 45 to 60 wt. %.

25. The method according to claim 23, wherein the sulfate-resistant cement contains the brownmillerite in an amount of the range of 15 to 25 wt. %.

26. The method according to claim 23, wherein the sulfate-resistant cement contains the dolomite in an amount of the range of 5 to 15 wt. %.

27. The method according to claim 23, wherein the sulfate-resistant cement contains the periclase in an amount of the range of 5 to 15 wt. %.

28. The method according to claim 23, wherein the sulfate-resistant cement contains calcium aluminum oxide in an amount of 3 wt. % or less.

* * * * *